March 8, 1966     J. R. GOODYKOONTZ     3,238,804
VARIABLE SPEED TRANSMISSION
Filed Feb. 20, 1964

INVENTOR
JAMES R. GOODYKOONTZ
BY Elliott & Pastoriza
ATTORNEYS

United States Patent Office 3,238,804
Patented Mar. 8, 1966

3,238,804
VARIABLE SPEED TRANSMISSION
James R. Goodykoontz, 627 San Vicente Blvd.,
Santa Monica, Calif.
Filed Feb. 20, 1964, Ser. No. 346,283
4 Claims. (Cl. 74—411)

This invention relates to a variable speed transmission system and more particularly to a mechanical type positive drive system as distinguished from fluid drives.

Many present day variable speed transmissions incorporate gear shifting means in which different size gears are brought into play to accommodate variable output loads or torques with a given amount of input power. For example, if the output load increases suddenly, the gear ratio between the input and output shafts is varied so that the output shaft will turn at a considerably lower rate of speed for a given input speed and thus provide the necessary increased torque to handle the load. With such gear shifting systems, speed variations take place in discrete steps.

In the case of continuous transmission systems, a friction type drive such as between a conical surface and a drive gear is provided. However, while a continuous speed variation is possible, the drive is not always positive since some slippage can occur between the conical surface and driven gear.

With all of the foregoing in mind, it is accordingly a primary object of this invention to provide a unique variable speed transmission system which is entirely mechanical in operation and positive in that a connecting engagement is always insured between the input and output shafts and yet in which the ratio of the input to output speeds may be continuously varied.

More particularly, it is an object to provide a variable speed transmission which will adjust to output loads while in motion and in which such adjustment is continuous as opposed to step-wise adjustment.

Another object is to provide a unique variable speed transmission which does not rely on friction drives so that slippage is avoided.

Briefly, these and many other objects and advantages of this invention are attained by providing an input shaft including an helical spring functioning as a worm gear. This spring cooperates with an output gear having teeth meshing with at least one coil portion of the spring. An output shaft rotatably mounts the output gear.

With the foregoing arrangement, rotation of the input shaft to rotate the helical spring will result in rotation of the output gear and shaft through the worm connection. However, when an increased load or torque occurs on the output shaft, the helical spring will tend to compress thereby changing the coil pitch, so that the output speed automatically is decreased. If the load decreases on the output shaft, the spring will tend to elongate to thereby increase its pitch and thus increase the speed of the output shaft.

A better understanding of the invention as well as various further features and advantages will be had by now referring to the accompanying drawings, in which.

Figure 1:
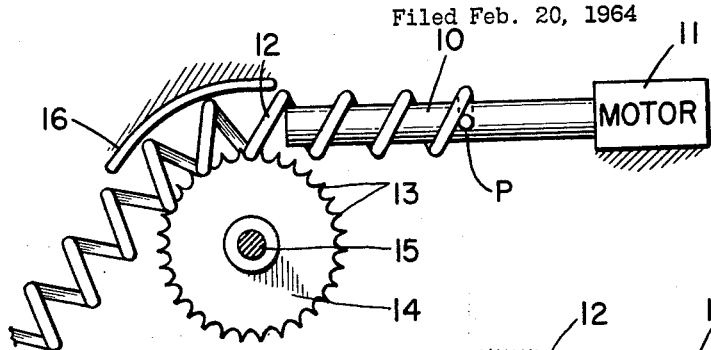
FIGURE 1 is a schematic view of the basic elements making up the variable speed transmission of this invention.

Referring first to FIGURE 1, the variable speed transmission system includes an input shaft 10 which may be driven by a motor 11. Secured to the input shaft is a variable speed transmission means in the form of a helical spring 12. As shown, the sprng 12 partally surrounds the input shaft 10, which serves as a guide, and has its extreme right hand end secured to a collar on the shaft as at the point P. The transmission also includes output gear teeth 13 on an output gear 14 supported by an output shaft 15. The input shaft 10 serves to position the helical spring 12 such that at least one of the coil portions thereof will be disposed between adjacent teeth 13 on the output gear 14.

The foregoing assembly is completed by a guide wall 16 which guides the helical spring 12 about an arcuate path so that more than one of the coils will engage the gear teeth 13 of the output gear 14.

In the operation of the unit illustrated in FIGURE 1, it will be clear that rotation of the input shaft 10 by the motor 11 will cause the helical spring 12 to rotate. Rotation of this spring 12 will then result in rotation of the output gear 14 as a consequence of the worm engagement of the helical coils with the gear teeth 13.

Figure 2:
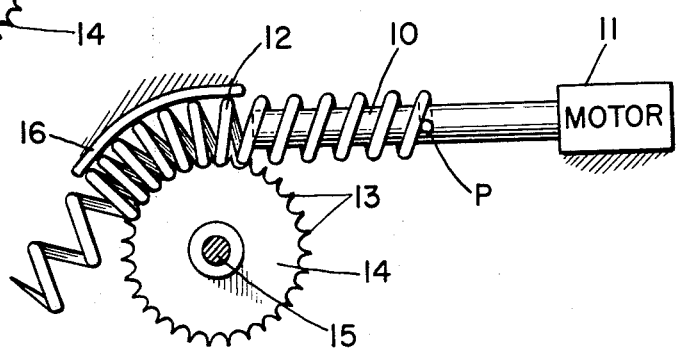
FIGURE 2 is a view similar to FIGURE 1 illustrating the relative positions of certain components when the torque on the output shaft has greatly increased.

If now the output load should increase, the resistance will result in a compression of the helical spring 12 to thus vary the effective pitch of the helical spring coils surrounding the shaft 10. As a consequence, the spring will assume a configuration such as illustrated in FIGURE 2 wherein because of the change in pitch, the output shaft 13 will rotate fewer times even though the input shaft 10 is still driven at the same constant input speed. Similarly, it will be clear that if the output load or torque on the output shaft 15 should decrease, the spring 12 will stretch out further since it need not push as hard against the teeth thereby increasing the pitch and thus increasing the speed of the output gear 14 for a given constant input speed.

Figure 3:
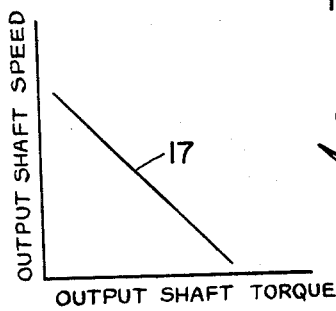
FIGURE 3 is a graph illustrating the output speed versus torque characteristics.

FIGURE 3 illustrates graphically the relationship of the output shaft speed to the output torque. This relationship is indicated by the straight line 17. Thus, as the output torque increases, the output speed decreases and this inverse relationship is linear.

Figure 4:
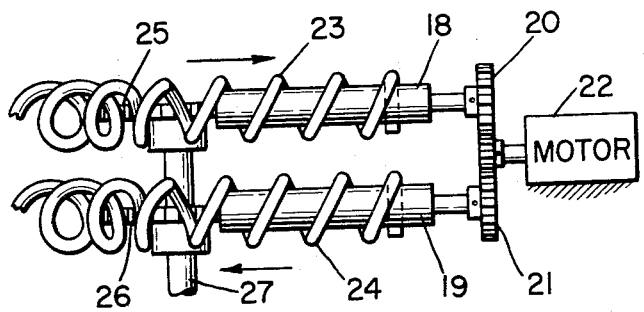
FIGURE 4 illustrates another embodiment of the invention in which "backlash" is eliminated.

FIGURE 4 illustrates a second embodiment of the invention wherein there are provided first and second input shafts 18 and 19 driven by gears 20 and 21 coupled to a motor 22. The input shafts 18 and 19 support helical springs 23 and 24 respectively meshing with output gears 25 and 26 connected to a common output shaft 27. By biasing the first spring 23 to exert a back tension on the output gear 25 as indicated by the upper arrow and simultaneously biasing the second spring 24 to exert a compression or forward force on the output gear 26 as indicated by the lower arrow, there will be no backlash or "play." Thus in the operation of the embodiment of FIGURE 4, rotation of the input shafts 18 and 19 in like directions will result in a driving of the output shaft 27 in the same manner as described in conjunction with FIGURES 1 and 2. On the other hand, should the load decrease or even pass through zero, there will be no point at which there is any "play" because of the unique parallel spring arrangement in which one of the springs is in tension and the other is in compression.

Another advantage of the unit illustrated in FIGURE 4 is the fact that twice as much power may be transmitted because of the use of two springs.

Figure 5:
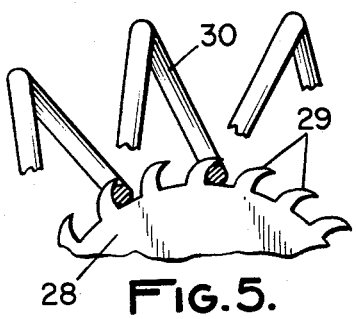
FIGURE 5 illustrates a modified tooth structure on the output gear.

FIGURE 5 depicts a fragmentary portion of an output gear 28 having unique teeth 29 designed to cooperate with a helical spring 20. In this embodiment, the teeth are arcuate shaped to define a cup portion so that the spring 30 may be caused to follow around an arcuate portion of the output gear without the necessity of a guiding wall such as indicated at 16 in FIGURES 1 and 2.

Figure 6:
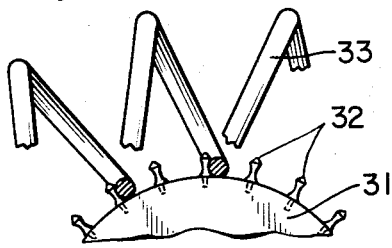
FIGURE 6 illustrates yet another tooth structure.

FIGURE 6 shows another modification in which an output gear 31 is provided with small posts 32 defining teeth. The posts 32 are rotatably mounted. By this arrangement, the helical spring 33 will rotate the small posts 32 thereby decreasing friction in driving the output gear 31.

Figure 7:
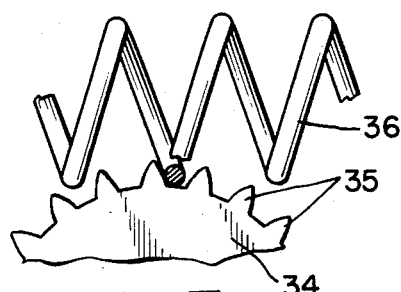
FIGURE 7 illustrates still another tooth structure for the output gear.

Finally, FIGURE 7 illustrates an output gear 34 having output teeth 35 of still another configuration. In this design, the leading arcuate edges are convex and so shaped that they will be engaged by the helical coils of the helical spring 36 when the helical spring 36 follows or rotates about a straight line axis. In other words, by making the teeth relatively long and shaping them as shown, the force applied at the point of engagement of the coils will successively always be "normal" to the engaged surface and the coil spring may travel essentially in a straight line rather than following a curved path. Thus, in FIGURE 7, there is no need for a guide wall such as illustrated at 16 in FIGURES 1 and 2.

Various other tooth shapes will occur to those skilled in the art depending upon the particular type of uses contemplated for the variable speed transmission.

From the foregoing description, it will be evident that the present invention has provided a greatly improved variable speed transmission. Not only is there always insured a positive mechanical connection between the input and output shafts so that no slippage can occur, but in addition, a continuous automatic torque adjustment takes place.

In actual embodiments of the invention, suitable stops may be provided to limit the degree of compression or expansion to define the degree of the pitch variation of the helical spring so that negative torques or loads on the output shaft 15 will not damage the structure.

Various modifications falling clearly within the scope and spirit of this invention will occur to those skilled in the art. The variable speed transmission is therefore not to be thought of as limited to the exact embodiments set forth merely for illustrative purposes.

What is claimed is:

1. A variable speed transmission comprising, in combination: an input shaft; a helical spring partially surrounding said input shaft, one end portion of said spring being secured for rotation with said input shaft, the other end portion of said spring being free to move toward and away from said one end portion; a gear having a plurality of teeth about its periphery; a guide wall of arcuate shape positioned to guide said helical spring in a curved path such that several of said coils engage between teeth simultaneously on said gear so that said gear is rotated upon rotation of said input shaft and spring; and, an output shaft secured to said gear for rotation therewith, whereby said spring will be elongated to vary the pitch thereof in response to a decrease of the torque applied to said output shaft and said spring will be shortened in response to an increase of the torque applied to said output shaft, thereby permitting the driving connection between said shafts to be sustained at a different speed ratio throughout the imposition of a different torque load.

2. The subject matter of claim 1, in which each of said gear teeth has a concave cup-shaped edge for engagement by said spring so that said spring is held captive by said gear teeth for a given arcuate path of rotation of said gear.

3. The subject matter of claim 1, in which each of said gear teeth is in the form of a roller type pin rotatably mounted about a radial axis of said gear.

4. A variable speed transmission comprising, in combination: an input shaft; a helical spring partially surrounding said input shaft, one end portion of said spring being secured for rotation with said input shaft; a gear having a plurality of teeth about its periphery positioned relative to said input shaft so that at least one of the coils of said spring meshes between adjacent gear teeth so that said gear is rotated upon rotation of said input shaft and spring; an output shaft secured to said gear for rotation therewith, the relationship between the output speed of said shaft and torque load exerted on said shaft being inversely linear for a constant input speed of rotation applied to said input shaft; and an additional input shaft, helical spring, and gear, similar to said first mentioned input shaft, helical spring, and gear, said additional gear being mounted on said output shaft in coaxial spaced relationship to said first-mentioned gear, said first mentioned spring being under a compression and said additional spring being under a tension; and common drive means for rotating said input shafts in the same direction and at the same speed so that back-lash in said output shaft is avoided.

References Cited by the Examiner

UNITED STATES PATENTS

| | | | |
|---|---|---|---|
| 511,269 | 12/1893 | Holmes | 74—458 X |
| 1,436,072 | 11/1922 | Allis | 74—458 X |
| 2,310,880 | 2/1943 | Stuber et al. | 74—458 |
| 2,578,592 | 11/1951 | Pile | 74—240 X |
| 2,635,479 | 4/1953 | Ubertini | 74—458 X |
| 2,682,176 | 6/1954 | Fagley et al. | 74—458 |
| 3,049,936 | 8/1962 | Schnell | 74—411 X |
| 3,147,853 | 9/1964 | Van Huis | 74—240 X |
| 3,163,054 | 12/1964 | Werner | 74—458 X |

FOREIGN PATENTS 823,224  12/1951  Germany.

DAVID J. WILLIAMOWSKY, *Primary Examiner.*
DON A. WAITE, *Examiner.*
J. A. WONG, *Assistant Examiner.*